(12) United States Patent
Lindblom

(10) Patent No.: US 7,252,465 B2
(45) Date of Patent: Aug. 7, 2007

(54) DRILL FOR CHIP REMOVING MACHINING

(75) Inventor: Stefan Lindblom, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 74 days.

(21) Appl. No.: 11/324,780

(22) Filed: Jan. 4, 2006

(65) Prior Publication Data

US 2006/0171787 A1    Aug. 3, 2006

(30) Foreign Application Priority Data

Jan. 5, 2005    (SE) .................................... 0500027

(51) Int. Cl.
*B23B 51/02*    (2006.01)

(52) U.S. Cl. ...................... 408/230; 408/227

(58) Field of Classification Search ................ 408/227, 408/229, 230; *B23B 51/00, 51/02*
See application file for complete search history.

(56) References Cited

U.S. PATENT DOCUMENTS

| | | | | |
|---|---|---|---|---|
| 451,896 A | * | 5/1891 | Merritt | ........................ 408/230 |
| 3,387,511 A | * | 6/1968 | Ackart, Sr. et al. | ......... 408/230 |
| 4,116,580 A | * | 9/1978 | Hall et al. | ................... 408/230 |
| 4,898,503 A | * | 2/1990 | Barish | ......................... 408/230 |
| 5,088,863 A | | 2/1992 | Imanaga et al. | |
| 5,230,593 A | | 7/1993 | Imanaga et al. | |
| 5,807,041 A | * | 9/1998 | Lindblom | .................... 408/230 |
| 6,309,149 B1 | | 10/2001 | Borschert et al. | |

FOREIGN PATENT DOCUMENTS

JP    57132908 A    *    8/1982

* cited by examiner

*Primary Examiner*—Daniel W. Howell
(74) *Attorney, Agent, or Firm*—Drinker Biddle & Reath LLP

(57) ABSTRACT

A drill for chip removing machining, including a front tip including at least one cutting edge and a chip flute. The chip flute is countersunk in an envelope surface of a body of the drill and extends rearwardly from the cutting edge. The chip flute is generally defined by a cross-section-wise concavely vaulted surface located between first and second longitudinal borders, the first longitudinal border extending from an area of a peripheral end of the cutting edge. The chip flute is deeper in an area of the first longitudinal border than in an area of the second longitudinal border such that a curve defining the cross-sectional shape of the flute surface has a radius of curvature that is smallest in the vicinity of the first longitudinal border and that increases towards the second longitudinal border. The flute surface transforms into a planar chip surface, which in turn transforms into the cutting edge.

12 Claims, 3 Drawing Sheets

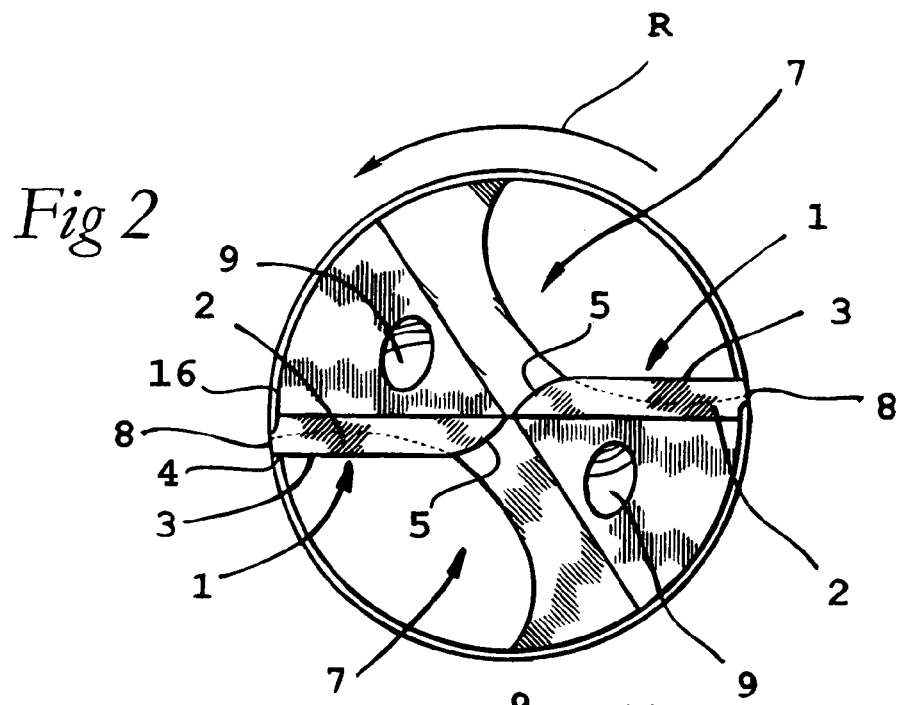
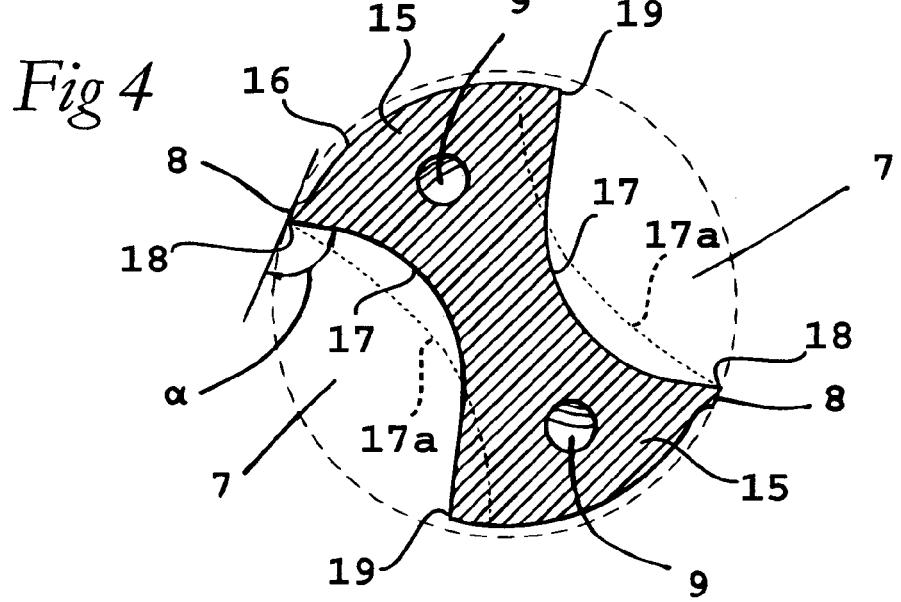
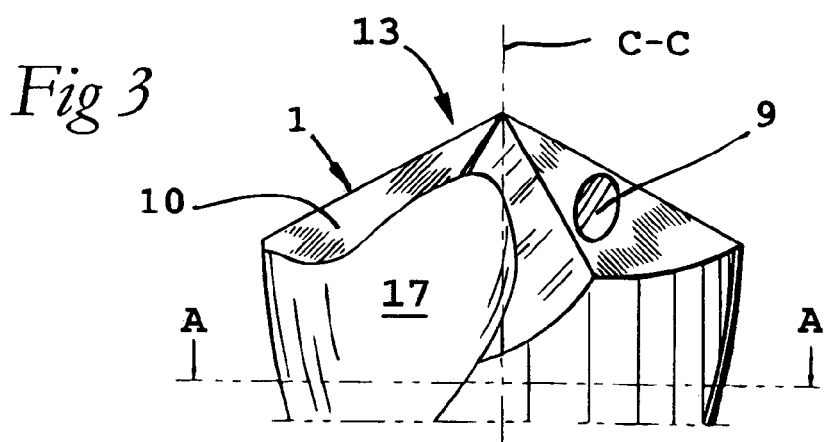

DRILL FOR CHIP REMOVING MACHINING

This application claims priority under 35 U.S.C. § 119 to Swedish Patent Application No. 0500027-8 filed on Jan. 5, 2005, the disclosure of which is incorporated by reference herein in its entirety.

FIELD OF THE INVENTION

The present invention relates generally to a drill for chip removing machining, including a front tip having at least one cutting edge, and a chip flute that is countersunk in an envelope surface and that extends rearwardly from the cutting edge. The flute is generally defined by a cross-section-wise concavely vaulted surface located between longitudinal borders, a first one of which extends from the area of a peripheral end of the cutting edge.

BACKGROUND OF THE INVENTION

As disclosed in U.S. Pat. Nos. 5,088,863 and 5,230,593, two types of drills for chip removing machining are previously known, one of the types having straight cutting edges, and the other of the types having curved cutting edges.

Generally, in drills having straight cutting edges, each chip flute is relatively shallow in the sense that a curve defining the concave cross-sectional shape of the flute surface has a comparatively large radius of curvature. This means that chip jamming easily arises in the space behind the cutting edge confined between the flute surface and the hole wall. This results in vibrations in the drill, which in turn may result in the drill breaking. In drills having curved cutting edges, the chip flute may be formed with a greater depth, i.e. a smaller radius of curvature. Thereby, the tendency for chip jamming in the flute is less than for drills having straight cutting edges. However, a curved cutting edge entails a number of disadvantages, such as the grinding of the cutting edge, the sharpness thereof, etc.

Thus, according to the known technique accounted for above, the design of the cutting edge also controls the design of the chip flute.

SUMMARY OF THE INVENTION

An object of the invention is to is to provide a drill of the kind defined by way of introduction, wherein the chip release should be improved and the risk of chip jamming should be reduced. Another object of the invention is to provide a drill entailing an improved hole quality. Still another object is to design a drill having an increased productivity. An additional object is to create a drill having a long service life.

In an embodiment, the invention provides a drill for chip removing machining, including a front tip including at least one cutting edge and a chip flute. The chip flute is countersunk in an envelope surface of a body of the drill and extends rearwardly from the cutting edge. The chip flute is generally defined by a cross-section-wise concavely vaulted surface located between first and second longitudinal borders, the first longitudinal border extending from an area of a peripheral end of the cutting edge. The chip flute is deeper in an area of the first longitudinal border than in an area of the second longitudinal border such that a curve defining the cross-sectional shape of the flute surface has a radius of curvature that is smallest in the vicinity of the first longitudinal border and that increases towards the second longitudinal border. The flute surface transforms into a planar chip surface, which in turn transforms into the cutting edge.

The flute surface adjacent the first longitudinal border and the envelope surface of the drill body may form an angle $(\alpha) \geq 90°$. The angle $(\alpha)$ may be $\leq 120°$. The chip surface may extend in a plane that is parallel with a center axis of the drill body. The chip surface may extend in a plane forming an acute angle $(\beta) \leq 25°$ with a center axis of the drill body. The acute angle may be formed such that $5° \leq (\beta) \leq 15°$.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 2 is an end view of the front tip of the drill.

FIG. 3 is a partial side view showing the tip of the drill.

FIG. 4 is a cross section A-A in FIG. 3

DETAILED DESCRIPTION OF THE PREFERRED EMBODIMENTS

Figure 1:
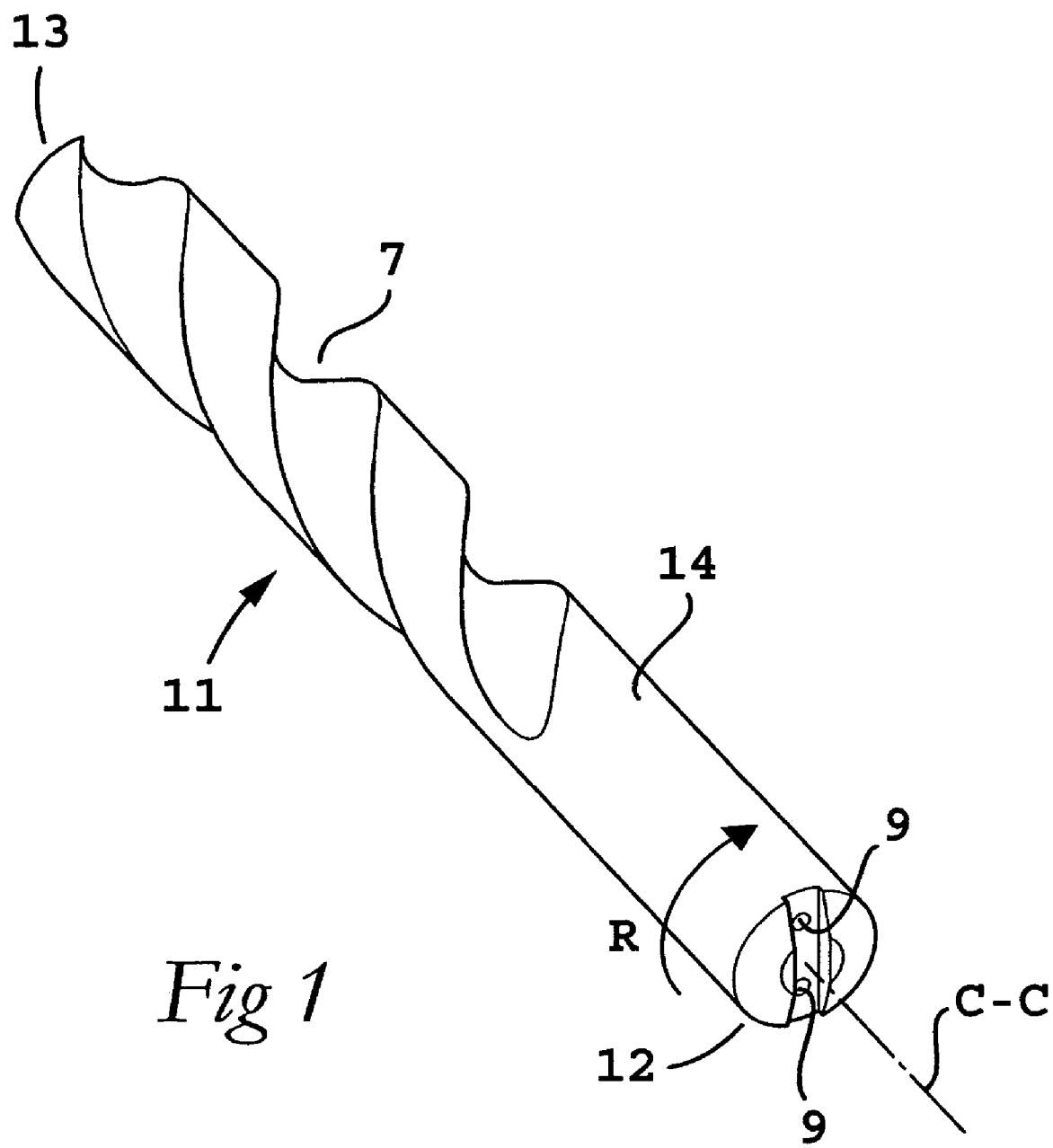
FIG. 1 is a perspective view of a drill according to an embodiment of the invention.

FIG. 1 illustrates the general design of a drill 11 according to an embodiment of the invention. The drill is in the form of an elongated body having a cylindrical basic shape and presenting a rearward end 12, and a front end in the form of a tip 13. A rear portion 14 of the body serves as a fastener, that can be mounted and fixed in a machine tool (not shown) for rotating the same, more specifically about a center axis C-C and in the direction of rotation R (see also FIG. 2). In an embodiment, the drill is solid, i.e., it is in its entirety manufactured from one and the same material, for instance cemented carbide, ceramics, cermet or high-speed steel.

As illustrated in FIG. 2, the drill 11 includes two cutting edges generally designated 1, which are identical and include a straight portion 3 as illustrated in the end view in FIG. 2. The straight portion 3 extends from an outer end 4 at the periphery of the drill and inwards towards the center of the drill, but not through the center of the drill. Each cutting edge 1 also includes a curved portion 5 in the area of the center of the drill, the portions 3 and 5 continuously transforming into each other. As used herein, the cutting edges 1 described above will be referred to as "straight cutting edges" in contrast to "curved cutting edges".

The surface 2 located behind each cutting edge 1, as seen in the direction of rotation R, constitutes a primary clearance surface.

The drill also includes two chip flutes 7, which extend from the cutting edges 1 and rearward along the drill body between the tip 13 and the rear fastener 14. In the embodiment illustrated, the chip flutes 7 are helicoidal. Furthermore, the drill includes two coolant ducts 9, which mouth in the area of the cutting edges 1 and extend helicoidally within the drill body to the rear end (see FIG. 1), more precisely within the bars 15 located between the chip flutes 7.

The drill is also provided with margins 8, which are located on the peripheral envelope surface 16 of the drill and extend rearwardly from the outermost ends 4 of the straight portions 3 of the cutting edges 1. The margins 8 follow the chip flutes 7, i.e., like the flutes, they extend helicoidally along the drill. Upon drilling, the margins 8 will guide the drill along the hole wall.

The drill according to the embodiment of the present invention is unique at least in the respect that it has straight cutting edges 1 in combination with a new design of the chip flutes 7.

Now reference is made to FIG. 4, which illustrates the cross-sectional shape of the chip flutes 7, each one of which is defined by a cross-section-wise concavely vaulted surface 17 located between first and second borders 18, 19, of which the first one 18 extends from the area of the peripheral end 4 of the cutting edge, while the second one 19 extends along an opposite bar 15.

The cross-sectional shape of chip flutes in previously known drills having straight cutting edges is indicated by the surfaces 17a shown by dashed lines. As illustrated in FIG. 4, the traditional chip flute defined by surface 17a is shallow or flattened in comparison with the deeper chip flute, defined by surface 17, according to an embodiment of the invention. Thus, a curve defining the shape of surface 17a has a rather great radius of curvature, the curve being symmetrical in relation to the center of the drill body, i.e. the deepest portion of the flute is located in the vicinity of the center. In contrast, the flute designed according to the embodiment of the invention is deepest in the vicinity of the first border 18 and more shallow near the second border. More specifically, a curve defining the cross-sectional shape of the flute surface 17 has a radius of curvature which is smallest near the first border 18 and successively increases towards the other border 19. By the fact that the chip flutes 7 according to the embodiment of the invention have been given a relatively great depth near the borders 18, the tendency for chip jamming decreases to a significant extent. As a consequence of the deepening of the flute in the vicinity of the border 18, the outermost portion of surface 17 connects to the periphery of the drill under an angle α that is generally larger than in the conventional chip flutes of the known drills. This angle α should be at least 90° and may be obtuse. Preferably, the angle should be 120° at most.

Figure 5:
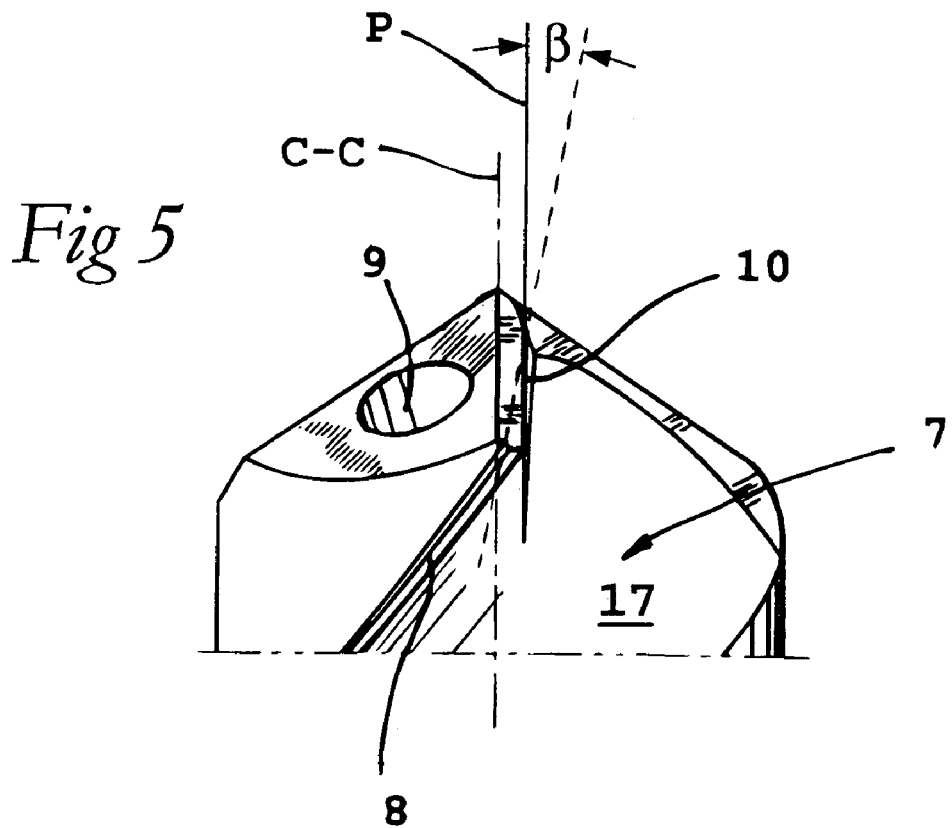
FIG. 5 is a partial side view of the tip of the drill, the same being rotated 90° in comparison with the view according to FIG. 3.
Figure 6:
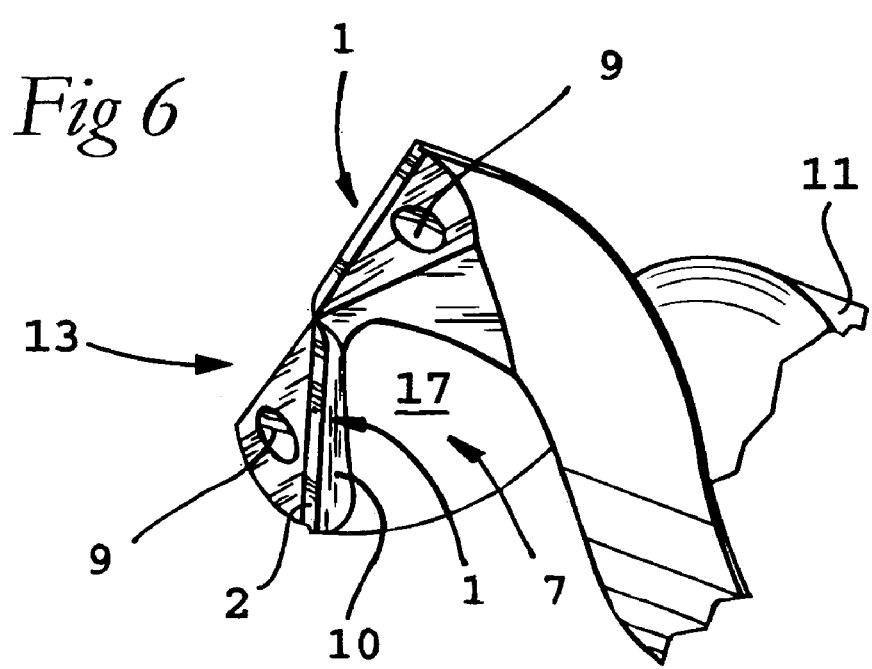
FIG. 6 is a partial perspective view of the drill tip.

Between each cutting edge 1 and an appurtenant chip flute 7, the drill according to the embodiment of the invention is also provided with a chip surface 10, which is illustrated in FIGS. 3, 5 and 6. This chip surface 10 is planar and connects to the cutting edge 1 and the flute surface 17. As shown in FIG. 5, the chip surface 10 extends in a plane P which is parallel to the center axis C-C of the drill.

The dashed line in FIG. 5 indicates that the chip surface 10 does not, however, have to be oriented parallel to the center axis C-C. Thus, the chip surface 10 may form an acute angle β with the center axis C-C, the angle amounting to a maximum 25°. Preferably, the angle β should be in the range of 5° to 15°.

As for the manufacture of the drill, one suitably starts from a blank in the form of a cylindrical rod, which preferably is made by extrusion. Thereby, it is possible to provide the blank with internal ducts for coolants, which extend helicoidally within the blank. In the blank, the chip flutes and some of the surfaces included in the drill tip are ground, the curved portions 5 of the cutting edges 1 being provided. Next, the planar chip surfaces 10 are ground in order to generate the straight portions 3 of the cutting edges. In the embodiment shown, each clearance surface 2 is planar too, meaning that the cutting edge portion 3 is straight not only as shown in the end view according to FIG. 2, but also as shown in the side view according to FIG. 3. This makes that a good control of the design of the straight edge portions 3 is obtained, at the same time as the transition between the chip surface 10 and the chip flute 7 gives a satisfactory space for chip transportation. Thus, the planar chip surface 10 provides a functional transition between a straight cutting edge 1 and a chip flute 7 that has a sufficient depth in order to counter-check chip jamming therein.

While the invention has been disclosed with reference to certain preferred embodiments, numerous modifications, alterations, and changes to the described embodiments are possible without departing from the sphere and scope of the invention, as defined in the appended claims and their equivalents thereof. For example, in an embodiment described above, the drill has two cutting edges and two chip flutes. The number of cutting edges and appurtenant chip flutes is, however, not critical to the invention. In an embodiment described above, the chip flutes extend helicoidally along the drill. However, the chip flutes may be straight provided that they have a concave shape in cross-section. Moreover, they may also be helicoidal closest to the drill tip and then straight. Accordingly, it is intended that the invention not be limited to the described embodiments, but that it have the full scope defined by the language of the following claims.

What is claimed is:

1. A drill for chip removing machining, comprising:
a front tip including at least one cutting edge and a chip flute, the chip flute being countersunk in an envelope surface of a body of the drill and extending rearwardly from the cutting edge, the chip flute being generally defined by a cross-section-wise concavely vaulted surface located between first and second longitudinal borders, the first longitudinal border extending from an area of a peripheral end of the cutting edge,
wherein the chip flute is deeper in an area of the first longitudinal border than in an area of the second longitudinal border such that a curve defining the cross-sectional shape of the flute surface has a radius of curvature that is smallest in the vicinity of the first longitudinal border and that increases towards the second longitudinal border, and
wherein the flute surface transforms into a planar chip surface, which in turn transforms into the cutting edge.

2. The drill according to claim 1, wherein the flute surface adjacent the first longitudinal border and the envelope surface of the drill body form an angle $(\alpha) \geq 90°$.

3. The drill according to claim 2, wherein the angle $(\alpha) \leq 120°$.

4. The drill according to claim 1, wherein the chip surface extends in a plane that is parallel with a center axis of the drill body.

5. The drill according to claim 2, wherein the chip surface extends in a plane that is parallel with a center axis of the drill body.

6. The drill according to claim 3, wherein the chip surface extends in a plane that is parallel with a center axis of the drill body.

7. The drill according to claim 1, wherein the chip surface extends in a plane forming an acute angle $(\beta) \leq 25°$ with a center axis of the drill body.

8. The drill according to claim 7, wherein $5° \leq (\beta) \leq 15°$.

9. The drill according to claim 2, wherein the chip surface extends in a plane forming an acute angle $(\beta) \leq 25°$ with a center axis of the drill body.

10. The drill according to claim 9, wherein $5° \leqq (\beta) \leqq 15°$.

11. The drill according to claim 3, wherein the chip surface extends in a plane forming an acute angle $(\beta) \leqq 25°$ with a center axis of the drill body.

12. The drill according to claim 11, wherein $5° \leqq (\beta) \leqq 15°$.

* * * * *